(No Model.)
F. W. SMITH, Jr.
PIPE THREADING MACHINE.
No. 508,581. Patented Nov. 14, 1893.
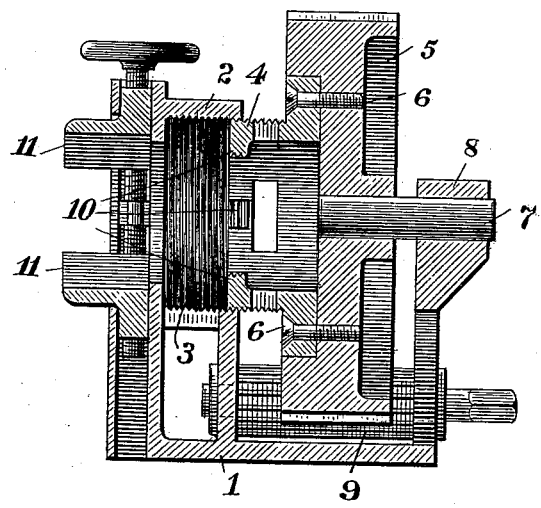
WITNESSES:
INVENTOR

UNITED STATES PATENT OFFICE.

FRIEND W. SMITH, JR., OF BRIDGEPORT, CONNECTICUT, ASSIGNOR TO CURTIS & CURTIS, OF SAME PLACE.

PIPE-THREADING MACHINE.

SPECIFICATION forming part of Letters Patent No. 508,581, dated November 14, 1893.

Application filed February 27, 1893. Serial No. 463,858. (No model.)

*To all whom it may concern:*

Be it known that I, FRIEND W. SMITH, Jr., a citizen of the United States, residing at Bridgeport, in the county of Fairfield and State of Connecticut, have invented certain new and useful Improvements in Pipe-Threading Machines; and I do hereby declare the following to be a full, clear, and exact description of the invention, such as will enable others skilled in the art to which it appertains to make and use the same.

My invention relates to certain new and useful improvements in pipe threading machines, but especially refers to that class of such machines as are operated by hand, and employ a sliding rotatory die-carrying ring whereby the threading die is advanced along the pipe to be threaded.

The object of my invention is to provide a machine of this description in which the threading dies shall be supported circumferentially in order that the strain caused by the action of said dies may be withstood without any disadvantageous leverage which always results when the dies are overhung on an axial shaft; also to provide an axial support for the die-carrying ring, whereby the latter will not lift from the actuating pinion, during the cutting of the threads, and thereby strain the machine at the aforesaid circumferential bearing of the die.

In the accompanying drawing I have shown a sectional elevation of a pipe threading machine made in accordance with my invention.

1 is a bed plate and 2 a casing supported thereon. The casing is interiorly threaded at 3, and an exteriorly threaded die head 4, secured to the die-carrying ring 5 by screws 6, adapted to travel after the manner of a screw in this threaded portion of the casing. Extending from the outer face of the ring 5 is an axial shaft 7 which is journaled loosely in a bearing 8 rising from the bed 1.

9 is an elongated pinion journaled in the frame of the machine and meshing with teeth on the periphery of the ring 5 whereby rotation may be imparted to the latter.

10 are the threading dies within the head 4.

11 is any suitable pipe holding vise secured to the frame at the rear of the casing.

During the threading of a pipe the die-head will advance within the casing and the ring 5 will slide along the pinion 8, the threads in the casing and on the die-head performing the function of lead-nut and lead-screw respectively.

While the positive leading of the dies is desirable it is not necessary, and the threads in the casing and on the die-head may be omitted without departing from the spirit of my invention. It will thus be seen that the die-head is supported circumferentially at the point where the work is accomplished, while at the same time the ring 5 is supported by the axial shaft 7 which latter is concentric with the die-head. Furthermore, my invention affords the advantage of a die-carrying ring supported in bearings on each side, so that the good results which attach to the circumferential journaling of the die-head are combined with the benefit of an axial journal to the die-carrying ring, whereby the action of the dies during the cutting of threads will not strain any of the parts, and the ring will not lift when it is driven by the pinion.

I have shown a die-head secured to the ring, but it is obvious that said head may be integral with said ring and constitute a hollow hub within which latter the threading dies may be secured, the gist of my invention resting in the broad idea of journaling the ring on each side within the casing and bearing 8 respectively, the journal in the casing carrying the threading dies, and both journals capable of lengthwise movements within their bearings.

I claim—

1. In a pipe threading machine, the combination of a casing adapted to be secured to the pipe to be threaded, a rotatory ring having a toothed periphery and an axial shaft which latter extends out from said ring and is loosely journaled in a bearing rising from the bed of the casing, a die-carrying head secured to said ring and having a circumferential bearing within said casing, and an elongated pinion engaging with the teeth on said ring to revolve the same substantially as set forth.

2. The combination with the casing adapted to be secured to the object to be threaded, of the rotatory toothed ring having extending from its face a hollow die-head and from its back an axial shaft, said head and shaft being journaled respectively within the casing and within a bearing rising from the bed of the casing, both journals being capable of a sliding movement within their bearings, and the elongated pinion engaging with the teeth on said ring, substantially as set forth.

In testimony whereof I affix my signature in presence of two witnesses.

FRIEND W. SMITH, Jr.

Witnesses:
HOWARD N. WAKEMAN,
J. S. FINCH.